United States Patent [19]

Matsuda et al.

[11] Patent Number: 5,969,829
[45] Date of Patent: Oct. 19, 1999

[54] IMAGE READER THAT STORES SETS OF LUMINANCE CORRECTION DATA CORRESPONDING TO DOCUMENT A SURFACE HEIGHT

[75] Inventors: Shinya Matsuda, Kyoto; Koichi Kamon, Takatsuki, both of Japan

[73] Assignee: Minolta Co., Ltd., Osaka, Japan

[21] Appl. No.: 08/933,263

[22] Filed: Sep. 18, 1997

[30] Foreign Application Priority Data

Sep. 19, 1996 [JP] Japan .................................... 8-247956

[51] Int. Cl.$^6$ ........................................................ H04N 1/04
[52] U.S. Cl. ........................... 358/475; 358/488; 358/497; 358/474; 358/444; 358/493; 355/25; 399/362
[58] Field of Search ..................................... 358/488, 497, 358/444, 475, 474, 493, 464, 465; 355/25, 55, 82; 399/362; 250/208.1, 234–236

[56] References Cited

U.S. PATENT DOCUMENTS

| 5,084,611 | 1/1992 | Okisu et al. ........................ 250/208.1 |
| 5,416,609 | 5/1995 | Matsuda et al. ........................ 358/474 |
| 5,585,926 | 12/1996 | Fujii et al. ................................ 358/471 |
| 5,616,914 | 4/1997 | Matsuda et al. ...................... 250/208.1 |
| 5,677,776 | 10/1997 | Matsuda et al. ......................... 358/475 |
| 5,764,379 | 6/1998 | Matsuda et al. ......................... 358/488 |
| 5,764,383 | 6/1998 | Saund et al. ............................ 358/488 |
| 5,831,750 | 11/1998 | Okisu et al. ............................ 358/475 |

FOREIGN PATENT DOCUMENTS 5219323  8/1993  Japan ............................... H04N 1/40

*Primary Examiner*—Edward L. Coles
*Assistant Examiner*—Cheukfan Lee
*Attorney, Agent, or Firm*—Sidley & Austin

[57] ABSTRACT

An image reader capable of outputting excellent quality read images, without illumination irregularities, similar to that of flat documents even when the document surface is curved as in the case of book-like documents. An image reader provided with a memory to store correction data to correct differences of illumination of each pixel of a document image, and which corrects the read information of each pixel in a document image using correction data corresponding to the measured height of a document surface among correction data stored in the memory. For one aspect, this image reader is constructed so as to correct a group of read information corresponding to a set of pixels arrayed in one direction by excluding specific frequencies among the illumination distribution from the set.

10 Claims, 6 Drawing Sheets

IMAGE READER THAT STORES SETS OF LUMINANCE CORRECTION DATA CORRESPONDING TO DOCUMENT A SURFACE HEIGHT

BACKGROUND OF THE INVENTION

1. Field of the Invention

The present invention relates to an image reader capable of reading bound documents such as bound files and magazines.

2. Description of the Related Art

Image readers have been commercialized as so-called book scanners. In these devices, an image sensing unit is arranged above a document table, so as to provide an open space several tens of centimeters in height between said document table and said image sensing unit. When reading a bound document (hereinafter referred to as "book document") such as a bound document file or magazine, a user places the open book document on the document table so that the document surface is facing upward. When the start key is pressed, an illumination lamp is turned ON, and prescanning is executed. Operation settings are set based on the information obtained by the prescan, and thereafter a main scan is executed. In the main scan, a read image is sequentially output to an external device. If the external device is a printer, a copy image is formed in real time. The efficiency of multi-page reading operations is increased because the pages of a book document disposed on a document table can be turned when using a book scanner. Furthermore, damage to scanned documents is greatly reduced 47 compared to arrangements requiring face-down orientation of open book documents. In the following discussion, book documents include filed documents.

Unlike a single sheet document, the document surface (i.e., the surface to be read) of a book document is curved. That is, the height of the document surface differs according to the position in a lateral direction (viewing direction). Due to this height differential, distortion occurs in the read image in accordance with the state of curvature and unsharpness of focus. A book scanner measures the state of curvature, and executes focus adjustment and distortion correction in accordance with said measured curvature. Methods of measuring the state of curvature of a document surface include a method of sensing the edge surface at the so-called "head" of a document and analyzing the edge surface image (U.S. Pat. No. 5,585,926), and a slit-projection method using three-dimensional measurement (Japanese Laid-Open Patent Application No. 5-219323).

The quality of the output image is improved by the aforesaid focus adjustment and distortion correction. Conventionally, however, there is the drawback of irregular density in the read image caused by the illumination of the document surface. Irregular illumination of the book document is dependent on the height distribution of the document surface, and cannot be eliminated even by measuring the light distribution of the illumination lamp relative to the flat surface of the document table for correction of reading data (i.e., shading correction) such as is accomplished by sheet-document reading devices such as copiers and the like.

SUMMARY OF THE INVENTION

An object of the present invention is to output read images of excellent quality without irregular density similar to that of flat documents even when the surface of the document is curved as in the case of book documents.

These objects are achieved by the image reader of the present invention comprising:

a document table to support a document;

an illumination means to illuminate the document; and an image sensing means to convert a document image to electric signals; and further comprising:

a memory to store correction data to correct differences of illuminance of each pixel of a document image in accordance with the height of the document surface;

means to measure the height of a document surface corresponding to each said pixel; and means to correct read information of each said pixel in a document image using correction data corresponding to the measured height of the document surface among correction data stored in said memory. This image reader is constructed so as to correct a group of read information corresponding to a set of said pixels arrayed in one direction to read information excluding specific frequencies among the illumination distribution from said set.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

The present invention stores in memory the correction data expressing correction content corresponding to a plurality of positions at different heights, e.g., a set of correction coefficients K ($K=D0/D1$) representing the ratio of read density D1 at various height positions and a standard density D0. During actual document reading, the height distribution of a document surface is measured, and the correction data corresponding to the measured height are used to correct the read information of each pixel of the document image. If the correction data are the correction coefficient K, the read density D of each pixels is multiplied by said correction coefficient K. If the correction data are data expressing a period (i.e., blank space frequency component) of irregular illuminance, filtering is executed to eliminate said frequency component.

The correction data can be calculated based on illumination measurement values at various height positions obtained, for example, by repeatedly changing the height at which a flat standard image is read. Correction data corresponding to other height positions can be calculated based on measurement values at a single or a plurality of height positions.

Figure 1:
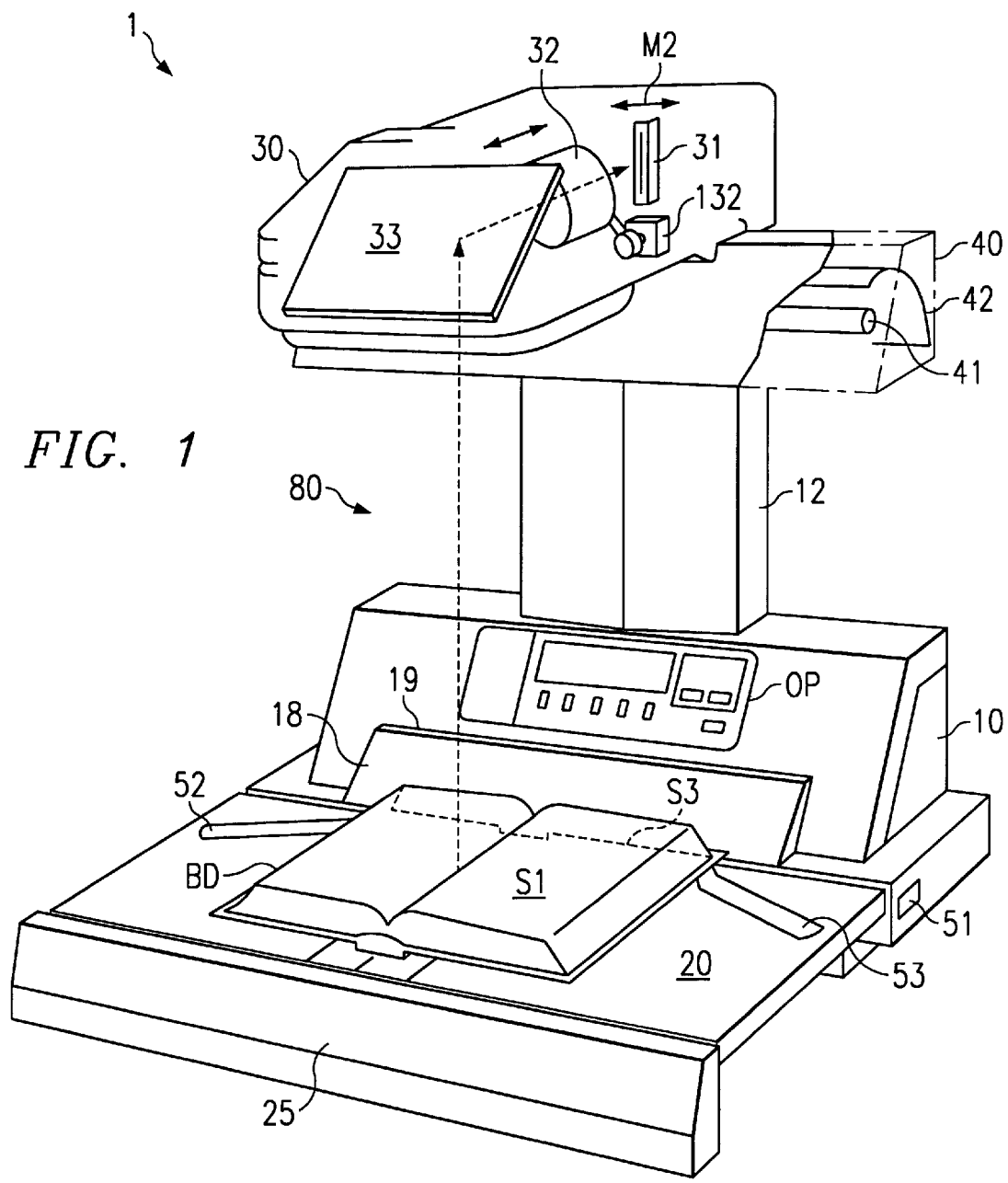
FIG. 1 is a perspective view of the exterior of the book scanner.
Figure 2A:
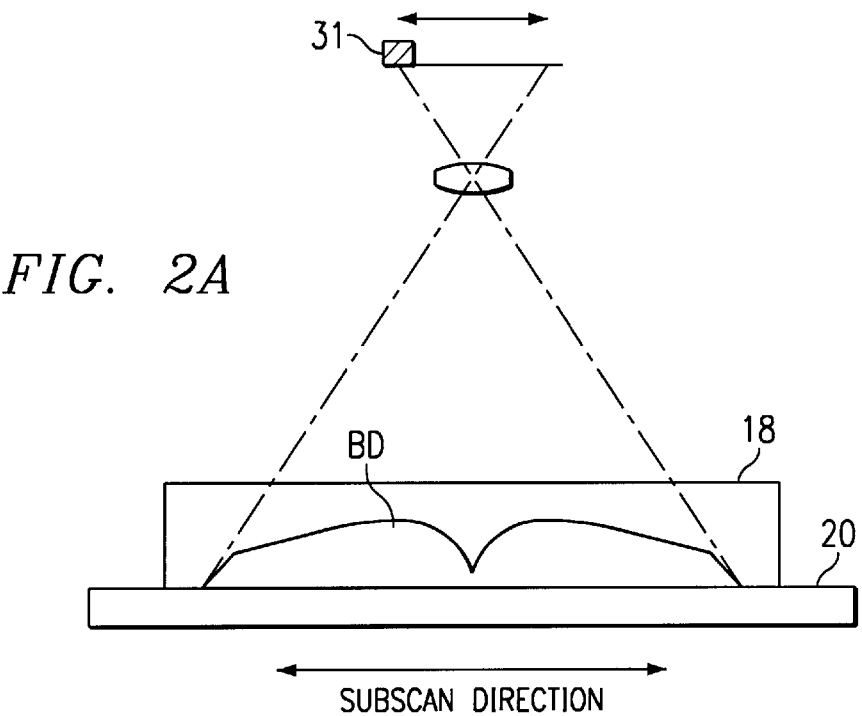
FIGS. 2A and 2B illustrate the reading mode of the book scanner.
Figure 2B:
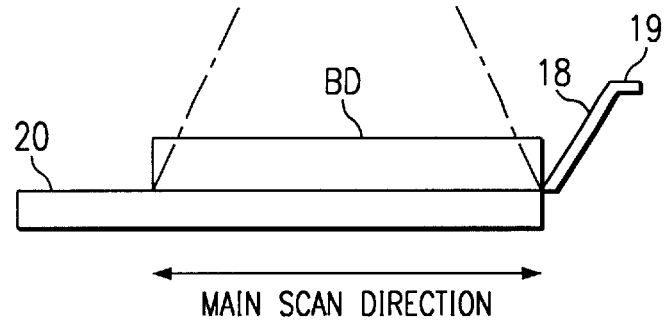

FIG. 1 is a perspective view of the exterior of a book scanner 1. FIGS. 2A and 2B illustrate the reading mode of book scanner 1.

Book scanner 1 is an image reader suitable for reading book documents (i.e., opened documents) BD, and comprises a housing 10 containing power source circuits and the like, document table 20 to support a document, image sensing unit 30 to convert a document image to electric signals, and lamp unit 40 to illuminate the document. Document table 20 is disposed at the front side of body housing 10. Image sensing unit 30 is arranged above document table 20 and is supported in an overhang-type configuration by column 12 extending vertically upward from the top surface of body housing 10. Lamp unit 40 is fixedly mounted on column 12 at a position on the bottom surface of image sensing unit 30, and is provided with a tube lamp 41 and reflector 42. An open space 80 formed between document table 20 and image sensing unit 30 is of sufficient size to accommodate the placement of book documents. The distance between document table 20 and the bottom surface of image sensing unit 30 is 30 cm or more.

An operation panel OP, including a liquid crystal display, is provided at the front top edge of body housing 10, and a projection panel 18 is fixedly mounted at the bottom edge to detect the height of the document surface. The surface of projection panel 18 is a glossy surface which is inclined at 45° relative to the top surface of the document table 20. The image of edge surface S3, in a direction perpendicular to the lateral direction of a book document BD, is reflected in projection panel 18, and the condition of said reflection in projection panel 18 is read together with the document image. The top edge surface of projection panel 18 is a flat surface parallel to document table 20 and is used as a white panel 19 for shading correction.

A main switch 51 is provided at the right side of body housing 10 when viewed facing operation panel OP. Start keys 52 and 53 are respectively provided on bilateral sides of document table 20 to allow users to start a reading operation, and an arm rest 25 is provided at the front side.

In FIG. 1, image sensing unit 30 has a line sensor 31 comprising a charge-coupled device (CCD), and image forming lens 32, and mirror 33. A document image is projected onto the photoreceptor surface of line sensor 31 via mirror 33 and image forming lens 32. Image forming lens 32 is constructed so as to be movable in front-to-back directions and is positioned by an autofocus mechanism (lens drive unit) 132. Line sensor 31 is attached to a movable body of a scanning mechanism not shown in the drawing, so as to be movable horizontally along the lateral direction (subscan direction) M2 while the direction of the array of the CCD elements are maintained in a vertical direction. A two-dimensional reading of a document image is accomplished by the aforesaid horizontal movement. That is, in book scanner 1, a two-dimensional image sensing plane is formed by the movement of line sensor 31. When an area sensor is used instead of line sensor 31, the photoreceptor surface of said area sensor becomes the image sensing plane. The main scan direction of the document image is the front-to-back direction on document table 20, and the vertical direction on the image sensing plane.

When using book scanner 1, a user places an open-faced book document BD face upward on the document table 20, as shown in FIG. 1. At that time, the border between right and left pages is aligned with the center of book document BD in a lateral direction, and book document BD is pushed against the bottom edge of projection panel 18 to position the document in the front-to-back direction. The border between projection panel 18 and document table 20 becomes the reference line of document placement. Document table 20 is supported by spring mechanisms so as to be movable downward in accordance with the weight of the document. Thus, the distance between the document surface S1 and the mirror 33 remains within a constant value range regardless of the thickness of book document BD.

Book scanner 1 executes a prescan and a main scan on the same document. Since book document BD has a curved document surface S1 unlike a sheet document, it is necessary to adjust the image sensing focus in accordance with the state of curvature. Image distortion correction processing is also required. Therefore, the state of curvature is detected in the prescan. In the prescan, the document size required to set the effective range is measured, and the background luminance of document surface S1 required for contrast adjustment is measured. The main scan operation settings are determined based on these prescan measurement results. In the main scan, focus adjustment is accomplished by moving image forming lens 32 in accordance with the measurement of the state of curvature of the document surface S1 in conjunction with the prescan. In a focused state, necessary data processing is accomplished on the read image data of each line, and after said processing the read data are output to an external device as read image information. Data processing in the main scan includes irregular illumination correction (described later) which is a characteristic feature of the present invention. Reading modes include a bilateral pages batch reading mode (sheet document mode), and bilateral pages individual page reading mode (book division mode). In both reading modes, both a prescan and a main scan are executed for each page.

Figure 3A:
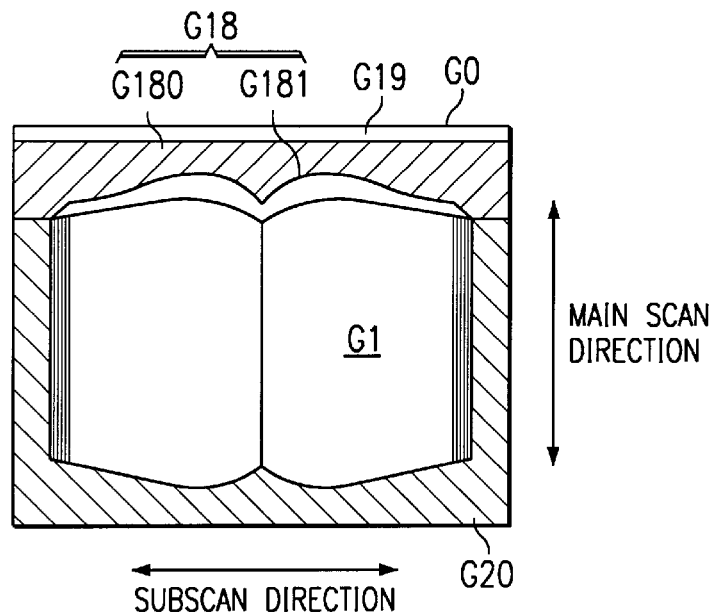
FIGS. 3A and 3B illustrate the method of measuring the state of curvature of a document surface.
Figure 3B:
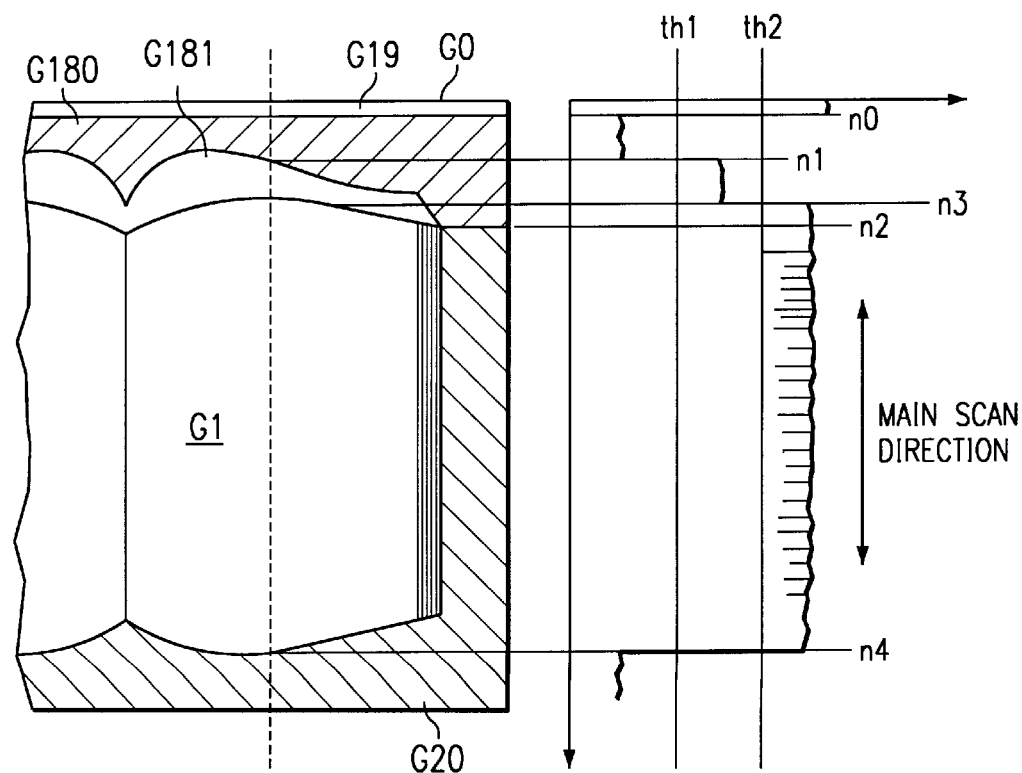

FIGS. 3A and 3B illustrate the method of measuring the state of curvature of a document surface. The dashed line in FIG. 3(B) indicates the position of the subject line.

A read image G0 comprises the read image G1 of the top surface of book document BD, the read image G20 of document table 20, the read image G18 of projection panel 18, and the read image G19 of white panel 19. The image G181 in projection image G18 expresses the shape of the top edge surface (hereinafter referred to as "head") of a placed book document BD. The image G180 other than image G181 (top edge image) in read image G18 is the background image reflected on projection panel 18.

Since the document table 20 is dark in color, as previously mentioned, the read image G20 produces a darker image in comparison to other images. Furthermore, the background image G180 also produces a darker image than edge image G181. Therefore, the top surface image G1 and edge surface image G181 can be extracted by discriminating the magnitude of their luminance values. Specifically, the luminance (pixel value) is checked sequentially from the first pixel of each line in the main scan direction. The known pixel position n0 on the trailing side corresponding to the border between the white panel 19 and the projection panel 18 is set as a subject, the pixel position (pixel number) n1 on the leading side of a range in which the luminance exceeds a first threshold th1 is detected, and the pixel positions n3 and n4 on the leading side and the trailing side of a range in which luminance exceeds a second threshold th2 (where th2>th1) are detected. The number of pixels between the pixel position n1 and the known pixel position n2 corresponding to the front edge of projection panel 18 corresponds to the height of the document surface S1 at said line, and the number of pixels between pixel position n3 and pixel position n4 corresponds to the document size in the main scan direction. The actual dimensions are determined by dividing the number of pixels by the image sensing resolution. The state of curvature of a document surface S1 is specified by combining the data expressing the height of the document surface S1 at all lines. The positions of the first lines and last lines at which the pixel positions n3 and n4 are detected correspond to the bilateral end positions of the document in the subscan direction.

In read image G0, the top edge and bottom edge of read image G1 form a curve because the height of the document surface S1 is not constant. That is, an object near the image sensing plane forms larger than an object farther away. During the main scan, image processing (image distortion correction) is executed to correct a curved read image G1 with respect to an image of a document surface S1, with a constant height based on the height information of document surface S1 obtained during the prescan. Specifically, regarding the main scan direction, a plane at a position a fixed distance (e.g., 5 cm) above the document table 20 is set as a reference plane, and the top surface image G1 is magnified in accordance with a height difference between the document surface S1 and the reference plane at each position in the subscan direction. Regarding the subscan direction, the top surface image G1 is magnified in accordance with the ratio of the projection distance of the document surface S1 to the document table 20 and the contour distance of the document surface S1 at each small interval.

The irregular illumination correction process, a characteristic feature of the present invention, is described below.

A constant reading density is desirable when reading documents without background with image readers not limited to book scanner 1. Some density differences occur in actual practice, however. The causes of this irregular density include irregular illumination, differences of the image sensing optical path (i.e., different angle and optical axis), differences of sensitivity among pixels of the image sensing device, and fluctuation of external light (e.g., fluorescent lamp flicker and the like). When reading an image using a line sensor, the sensitivity differences of the image sensing device produces irregular density in the main scan direction, and external light fluctuation produces irregular density in the subscan direction.

In book scanner 1, when a book document BD is read, the illuminance of the high parts of document surface S1 illuminated by lamp 41 is greater than the low parts of said document surface S1, such that differences in density occur in accordance with the height of said document surface S1. In addition, the luminance distribution in the main scan direction is particularly dependent on the height of the document surface S1.

Figure 4:
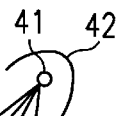
FIG. 4 shows the dependence of the height on the illumination distribution in the main scan direction.

FIG. 4 shows the height dependency characteristics of luminance distribution in the main scan direction.

The lamp unit reflector 42 is arranged so as to uniformly illuminate the top surface of document table 20. Some lighting unevenness occurs in actual practice, however. Illumination light expands radially along the main scan direction, so as to produce differences in luminance distribution in the main scan direction according to the height. FIG. 4 shows examples of luminance distributions at heights H1, H2, and H3. The luminance distribution in the subscan direction is virtually constant regardless of the height because lamp 41 has a sufficient length relative to the document.

In view of this height dependency of the luminance distribution, in order to improve the reading quality of book document BD, the book scanner 1 of the present embodiment provides an illuminance irregularity correction function to correct read data according to the height of document surface S1 measured during the prescan using correction data DK(x,y,h) stored beforehand in correction memory 120 prior to operating book scanner 1. The correction data DK(x,y,h) express the ratio of the read density D(x,y,h) at each position allocated in main scan direction (X), subscan direction (Y), and height direction (H) at intervals on the document table 20 (DK(x, y, h)=D0/D(x, y, h)). The correction data DK(x,y,h) are calculated based on read data obtained by repeatedly changing the height of a white non-background sheet document. In the main scan, luminance irregularity as well as optical path differences and sensitivity differences of photoelectric conversion can be corrected by multiplying the read data DS(x,y,h) of each pixel of a document image by the correction data DK(x,y,h) corresponding to each said pixel position (X, Y, H position). Luminance irregularity due to external light fluctuation can be corrected by extracting the fluctuating component of the luminance via white panel 19, and uniformly multiplying the read data of all the image within a line by the correction coefficient corresponding to said fluctuation component.

Figure 5:
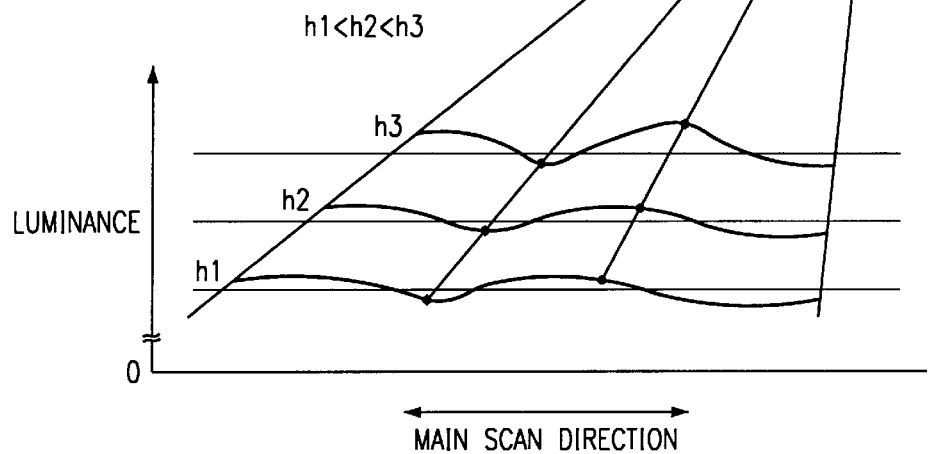
FIG. 5 is a block diagram of the signal processing unit of the book scanner.

FIG. 5 is a block diagram of signal processing unit 100 of book scanner 1.

Signal processing unit 100 comprises a central processing unit (CPU) 101, analog-to-digital (A/D) converter 102, image processing unit 103, random access memory (RAM) 105, comparator 111, counter 112, correction memory 120, and irregular luminance correction circuit 125.

The correction memory 120 is in an initialized state at the stage of completed assembly of the book scanner 1 during the manufacturing process. The correction data DK(x,y,h) are stored in correction memory 120 according to the following summary during the adjustment process prior to shipping from the factory.

An operator selects the correction data storage mode by operating dip switch (not shown) located on the signal processing unit 100. A white, non-background sheet-type standard document is placed on document table 20, and the reading start is specified. In the correction data storage mode, the photoelectric conversion signals output from line sensor 31 are converted to, for example, 8-bit image data and temporarily stored in correction memory 120 in their pixel array sequence as standard document read data D(x, y, h0). CPU 101 fetches the read data D(x, y, h0) when appropriate and, for example, performs a standardizing calculation to standardize the maximum output of A/D converter 102, and calculates correction data DK(x, y, h0) of each pixel at positions of height [0]. The calculated correction data DK(x, y, h0) are substituted for the read data DS(x, y, h0) and stored in correction memory 120. An operator places the standard document at a second position higher than the previous position using an auxiliary document table, and restarts the reading process. The second position correction data DK(x, y, h1) are obtained by an operation identical to that previously described, and stored in correction memory 120. Thereafter, an operator repeatedly changes the placement height of the standard document and reads said document at each said height via the same operation, and the correction data DK(x,y,h) obtained at said plurality of vertical positions are stored in correction memory 120. Correction memory 120 is a nonvolatile memory which maintains the stored contents even after the product is shipped from the factory.

The sampling positions in the vertical direction may be stored beforehand by CPU 101 by predetermining the height h of each sample height, or an operator may input the height h as a numeric value for each change in height. Although the correction precision increases with finer sampling positions in the vertical direction H, when the sampling interval in the vertical direction H is set, for example, at several millimeters, the correction data DK(x,y,h) at height positions between autologous sampling positions can be readily extrapolated. When extrapolating correction data, a calculation method is used which considers the incidence angle of illumination light relative to the target pixel, distance to the light source, image sensing angle and the like. Furthermore, the content of correction memory 120 may be reduced by setting adjacent fixed pixels as correction units in the main scan direction, subscan direction, and vertical direction, to create common correction data DK(x,y,h).

These correction data are used when executing the prescan and main scan.

In the prescan, read data D10(x,y), which have been quantized by A/D converter 102, are input to illumination irregularity correction circuit 125 in their pixel array sequence. In parallel with this process, correction data DK(x,y,h) are input to illumination irregularity correction circuit 125 for each scan line, for example, correction data DK(x,y,h) of height positions selected based on a standard book document height distribution. Illumination irregularity correction circuit 125 outputs read data D11(x,y), which is the sum of read data D10(x,y) and correction data DK(x,y,h). After this correction, read data D11(x,y) is transmitted to comparator 111. Comparator 111 compares the input read data D11 to threshold values th1 and th2, and transmits the comparison results to CPU 101 and counter 112. Counter 112 counts the number of pixels at which the luminance exceeds the threshold value th1 at the trailing edge from pixel position n0. That is, counter 112 measures the height of document surface S1. CPU 101 fetches the count value of counter 112, and generates height data DH(h) expressing the state of curvature (height distribution) of document surface S1. CPU 101 also fetches the pixel positions n3 and n4 detected by comparator 111, and generates size data DS expressing the apparent size of the flat surface of the document. Height data DH(h) and size data DS are temporarily stored in RAM 105. After the prescan ends, CPU 101 generates control data to correct image distortion and accomplish focus adjustment, and sets the output image range (effective reading range) in preparation for the main scan based on the height data DH(h) and size data DS.

In the main scan, the read data D10 which have been quantized by A/D converter 102 are input to illumination irregularity correction circuit 125. In parallel with this process, correction data DK(x,y,h) are input to illumination irregularity correction circuit 125 based on height data DH(h) of height positions selected in accordance with the height of document surface S1 measured in the prescan. Illumination irregularity correction circuit 125 outputs read data D11(x,y), which is the sum of read data D10(x,y) and correction data DK(x,y,h). The corrected read data D11(x,y) is transmitted to image processing circuit 103. Image processing unit 103 executes processing to correct illumination irregularity caused by external light fluctuation, MTF correction to improve image quality, variable magnification processing including correction of image distortion caused by curvature of document surface S1, gamma correction, and masking to set the regions outside the output image range as blank space. The read data D12 that have been subjected to specific image processing are output to an external device (e.g., digital copier) as image information of a read document image.

CPU 101 controls drive systems including the scanner drive unit 130, image sensing control circuit 131, lens drive unit 132, and lamp control unit 140. CPU 101 is connected to operation panel OP, and various switches. RAM 105 is used to temporarily store various data relating to controls.

Figure 6:
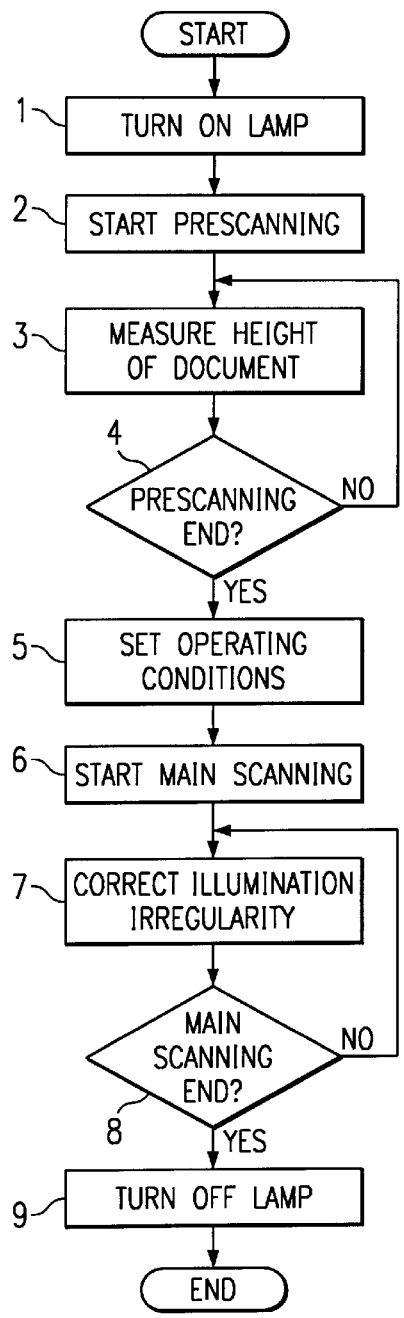
FIG. 6 is a flow chart briefly showing the operation of the book scanner.

FIG. 6 is a flow chart briefly showing the operation of book scanner 1.

When either of a pair of start keys 52, 53 are turned ON, CPU 101 issues instructions to lamp control unit 140 to turn ON lamp 41 (#1), and issues instructions to scanner drive unit 132 and image sensing control circuit 131 to start the prescan (#2). During the prescan, the height of the document surface S1 is measured as previously described (#3). When the prescan ends (#4), CPU 101 sets the operating conditions such as the content of image processing, output format and the like, as preparation for a main scan (#5). Thereafter, CPU 101 issues instructions to scanner drive unit 132 and image sensing control circuit 131 to start the main scan (#6). During the main scan, illumination irregularity is corrected using the correction data DK(x,y,h) as previously described (#7). When the main scan ends (#8), the illumination lamp is turned OFF and the CPU 101 returns to a standby state (#9).

Although correction data DK of each fine-division sample position in the three X, Y, H directions are stored in memory in the previously described embodiment, in order to reduce the content of correction memory 120, correction data DK(x,h) corresponding to pixel groups of one line in the X direction and correction data DK(y,h) corresponding to pixel groups of one column in the Y direction may be stored beforehand, so as to accomplish correction by multiplying correction data DK(x,h) and correction data DK(y,h) corresponding to pixel positions of the correction subject. Since illumination irregularity has virtually no discernable height dependency in the Y direction as previously mentioned, X direction correction may be accomplished based on correction data DK(x,h) and height data DH(h) at each of a plurality of height positions, and Y direction correction may be accomplished by adding or subtracting data values corresponding to height data DH(h) without using correction memory 120. Furthermore, the mean values of correction data at maximum and minimum height positions may be stored so as to accomplish correction using said mean values regardless of the height of document surface S1 without storing the correction data DK at a plurality of height positions. Illumination irregularities caused by height dependency of the illumination distribution are most markedly manifest when the illumination distribution exhibits an inverse phase between the maximum height position and the minimum height position. Accordingly, such irregularity can be reduced by using the aforesaid mean values. In this instance mean value corresponds to a correction coefficient K calculated from the illumination distribution at intermediate height positions.

Figure 7:
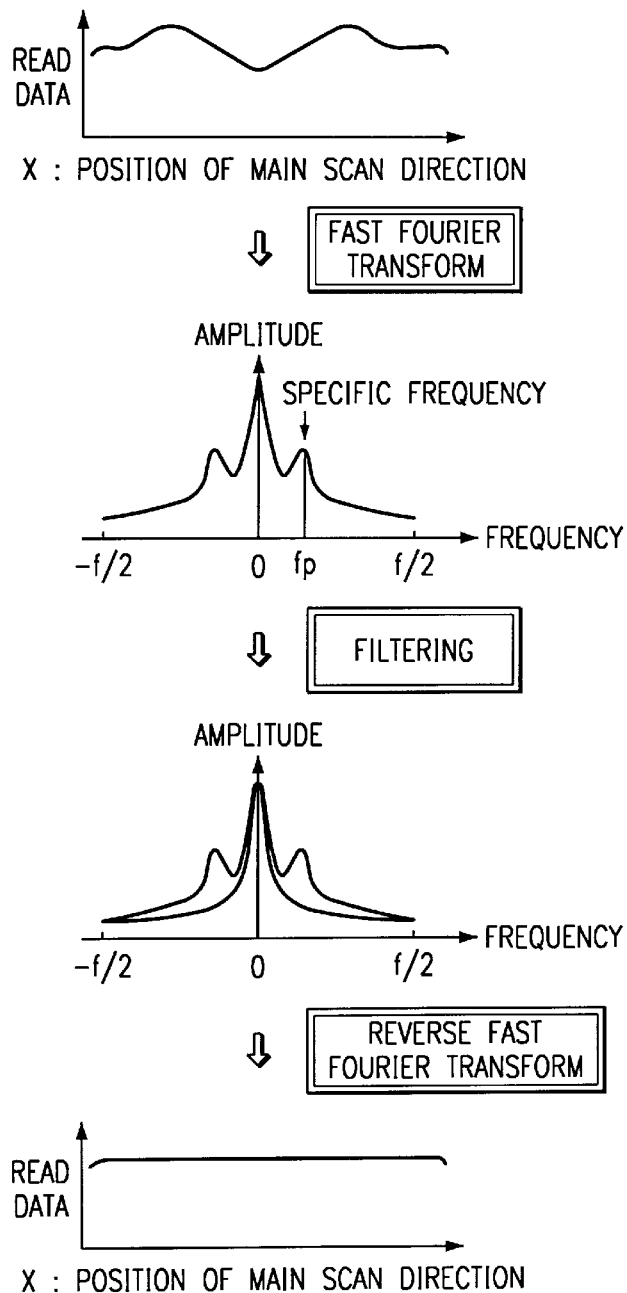
FIG. 7 shows an example of the content of the correction process.

Another embodiment is described below, wherein illumination irregularity correction is accomplished using filtering to extract periods of illumination distribution and exclude irregular components from said periods. Illumination irregularity caused by polarization of light distribution as shown in FIG. 4 is a periodic irregularity. Accordingly, the occurrence of illumination irregularity can be reduced by excluding components having this periodicity. Specifically, the specific frequency fp of light distribution is extracted by fast Fourier transform from read data of a white, non-background, standard document, as shown in FIG. 7. The height difference of this characteristic frequency fp and its specific amplitude ap are multiple sets stored beforehand in correction memory 120. During document reading, the illumination irregularity correction circuit 125 filters the read data to exclude components having the specific frequency fp and specific amplitude ap.

An embodiment wherein the low frequency component and high frequency component are separated and removed is described below.

Figure 8:
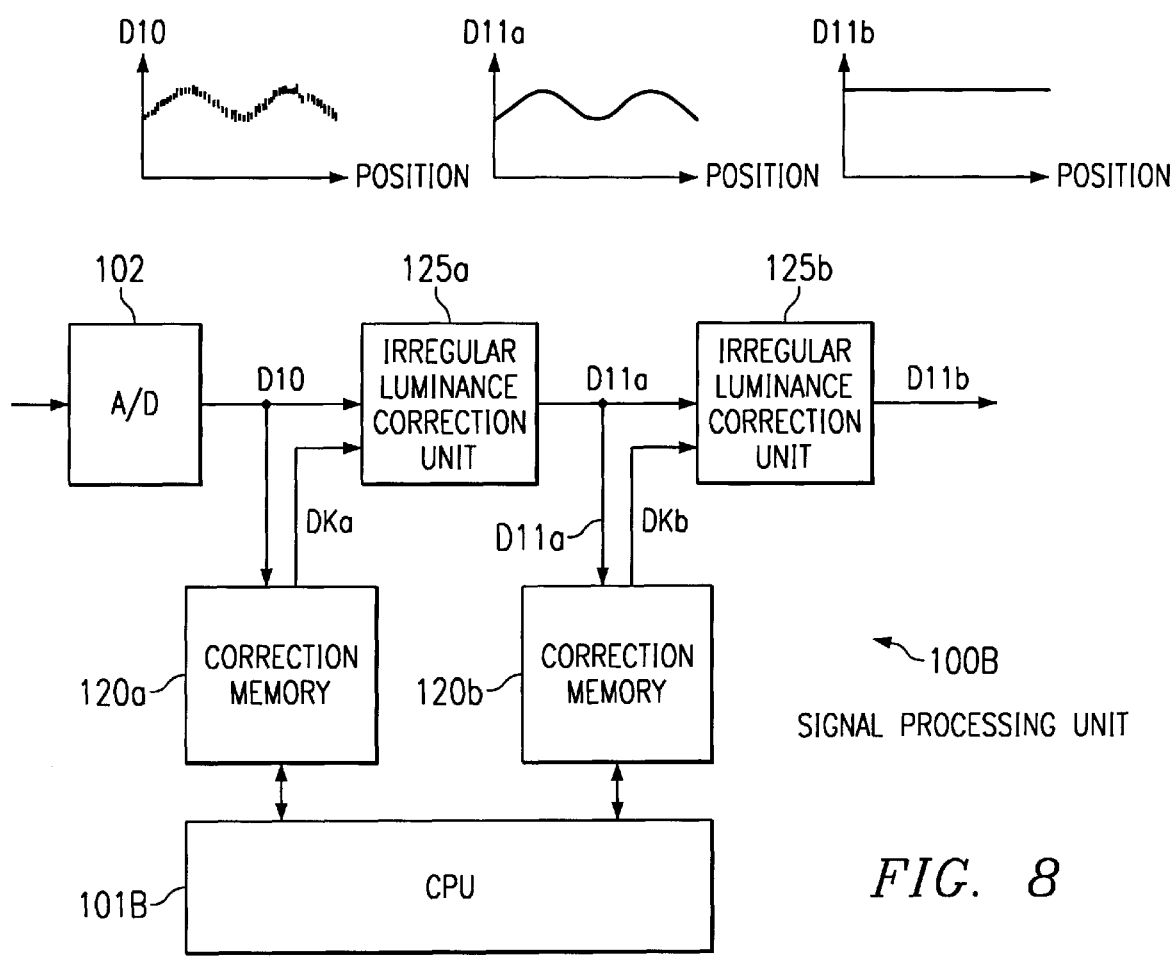
FIG. 8 is a block diagram showing an example of a modification of the signal processing unit.

FIG. 8 is a block diagram of the signal processing unit of this embodiment.

Signal processing unit 100B comprises two correction memories 120a and 120b, and two illuminance irregularity correction circuits 125a and 125b.

One correction memory 120a stores correction data DKa for short period irregularities (high frequency component) caused by sensitivity differences of the photoelectric conversion elements. The other correction memory 120b stores correction data DKb for relatively long period irregularities (low frequency component) caused by polarization of light distribution and lens characteristics. Correction data DKa are obtained by, for example, using a diffusion plate to render illumination uniform so as to standardize the read data of a read standard image. Correction data DKb are obtained by standardizing read data after correcting standard image read data using correction data DKa.

In the main scan, read data D10 which have been quantized by A/D converter 102 are corrected by illumination irregularity correction circuit 125a based on correction data DKa. In this correction, the read data D11a from which the high frequency component has been removed is corrected by removing the low frequency component in illumination irregularity correction circuit 125b based on correction data DKb. The read data D11b which have been processed by illumination irregularity correction circuit 125b are transmitted to the image processing circuit in a later stage. According to this construction, since the correction data DKb are calculated using the read data of a standard image which does not contain a high frequency component, there is increased accuracy in processes such as interpolation calculation, mean calculation, fast Fourier transform and the like.

According to the present invention, excellent quality read images can be output without illumination irregularities similar to that of flat documents even when the document surface is curved as in the case of book documents.

Although the present invention has been fully described by way of examples with reference to the accompanying drawings, it is to be noted that various changes and modifications will be apparent to those skilled in the art. Therefore, unless such changes and modifications otherwise depart from the scope of the present invention, they should be construed as being included therein.

What is claimed is:

1. An image reader which reads a document surface of an open book-like document placed on a document platen in a face upward condition and detects a height of the document surface, said image reader comprising:

illuminating means for illuminating the document surface, said illuminating means having illuminance irregularity;

reading means for converting an image of the document surface to image data;

memory means for storing a plurality of sets of illuminance correction data to correct differences of illuminance of image data of the document surface, each set corresponding to a height of the document surface;

detecting means for detecting a height distribution of the document surface; and correcting means for correcting the image data using said illuminance correction data sets based on the height distribution.

2. The image reader as claimed in claim 1, wherein said detecting means comprises a mirror reflecting a side view of the document to said image sensing means.

3. The image reader as claimed in claim 1, wherein said reading means comprises a line sensor.

4. The image reader as claimed in claim 1, wherein said reading means comprises an area sensor.

5. The image reader as claimed in claim 1, further comprising a filter which removes a high frequency noise from the read image data.

6. An image reader which reads a document surface of an open book-like document placed on a document platen in a face upward condition and detects a height of the document surface, said image reader comprising:

a line sensor which reads the document surface, said line sensor extending in a main scanning direction and being moved in a sub-scanning direction;

illuminating means for illuminating the document surface, said illuminating means having an illumination irregularity with respect to the main scanning direction;

memory means for storing a plurality of sets of illuminance correction data with respect to the main scanning direction, each set corresponding to a height of the document surface;

detecting means for detecting a height distribution of the document surface with respect to the sub-scanning direction; and correcting means for correcting the image data read by the line sensor using said illumination correcting data sets based on the height distribution.

7. The image reader as claimed in claim 6, wherein said detecting means comprises a mirror reflecting a side view of the document to said image sensing means.

8. The image reader as claimed in claim 6, further comprising a filter which removes a high frequency noise from the read image data.

9. A method of processing an image of an open book-like document placed on a document platen of an image reader in a face upward condition, the method comprising the steps of:

memorizing a plurality of sets of illuminance correction data, each set corresponding to a height of the document surface;

illuminating the document surface;

detecting a height distribution of the document surface;

reading the document and outputting image data; and correcting the image data using said luminance correction data sets based on the height distribution.

10. A method of processing an image of an open book-like document placed on a document platen of an image reader in a face upward condition, the method comprising the steps of:

reading the document surface by moving a line sensor in a sub-scanning direction, said line sensor extending in a main scanning direction;

illuminating the document surface with an illuminating light, wherein the illuminating light has an illumination irregularity with respect to the main scanning direction;

storing a plurality of sets of illuminance correction data with respect to the main scanning direction, each set corresponding to a height of the document surface;

detecting a height distribution of the document surface with respect to the sub-scanning direction; and correcting the image data read by the line sensor using said illumination correcting data sets based on the height distribution.

* * * * *